United States Patent [19]

Kato et al.

[11] 4,393,012
[45] Jul. 12, 1983

[54] TEMPERATURE-RESPONSIVE CONTROL DEVICE FOR CARBURETOR

[75] Inventors: Takashi Kato, Mishima; Masaharu Hayakawa, Tokai, both of Japan

[73] Assignee: Toyota Jidosha Kogyo Kabushiki Kaisha, Aichi, Japan

[21] Appl. No.: 336,081

[22] Filed: Dec. 31, 1981

[30] Foreign Application Priority Data

Mar. 9, 1981 [JP] Japan ................................ 56-32529

[51] Int. Cl.³ .............................................. F02M 1/12
[52] U.S. Cl. .............................. 261/39 A; 261/39 E; 261/44 C; 261/121 B; 60/527
[58] Field of Search ................. 261/39 A, 39 E, 44 C, 261/121 B; 60/527, 523

[56] References Cited

U.S. PATENT DOCUMENTS

| | | | |
|---|---|---|---|
| 3,645,509 | 2/1972 | Eckert et al. ...................... | 261/39 A |
| 3,740,040 | 6/1973 | Brown et al. ...................... | 261/39 A |
| 4,081,499 | 3/1978 | Ishii et al. ........................... | 261/39 E |
| 4,244,333 | 1/1981 | Matsumoto ........................ | 261/39 A |
| 4,311,653 | 1/1982 | Kushida ............................. | 261/39 A |
| 4,344,898 | 8/1982 | Takada et al. ..................... | 261/39 E |

FOREIGN PATENT DOCUMENTS 54-125332  9/1979  Japan .................................. 261/39 A Primary Examiner—Tim R. Miles
Attorney, Agent, or Firm—Browdy & Neimark

[57] ABSTRACT

A temperature-responsive control device for carburetors in which a heat-generating body produces heat as the engine is started from the cold state to heat up a heat-mass through an annular contact portion. The heat-mass temperature then rises with a certain time lag to the rise of the temperature of the heat-generating body. A thermo-wax unit is heated by the direct contact of its heat sensing portion with the heat-mass or through a contacting flange in a manner to isolate and float the heat-sensing portion to make a temperature rise substantially in conformity with the engine warming up characteristics or approximating as much as possible the same, to dismiss the choke mechanism and the fast idle cam at adequate timing through the action of the actuating rod. In consequence, it is possible to obtain a good driveability. When the engine is re-started in the heated state, the thermowax has been cooled approximating the cooling characteristics of the engine to avoid excessive enrichment of the mixture to ensure a safe re-starting of the engine.

5 Claims, 12 Drawing Figures

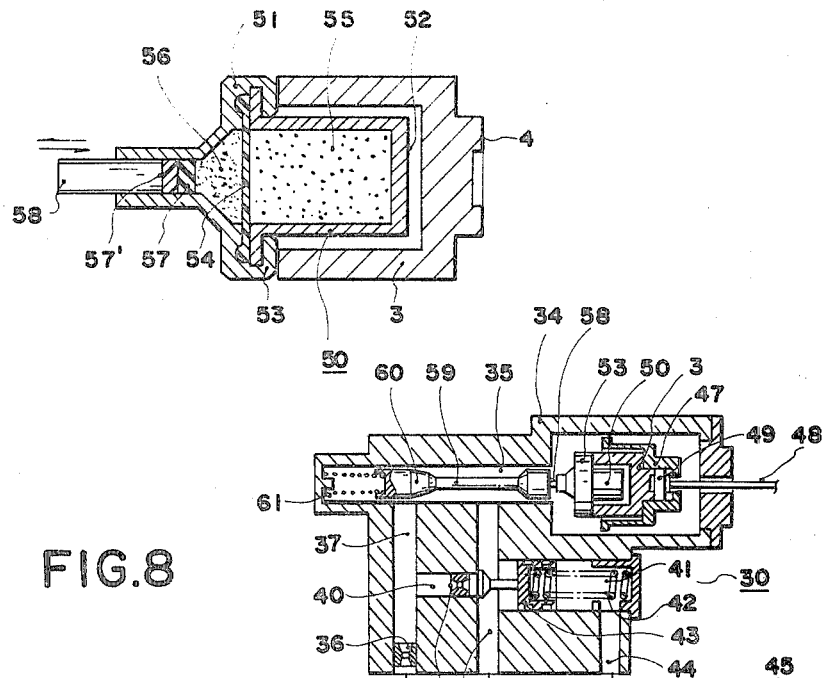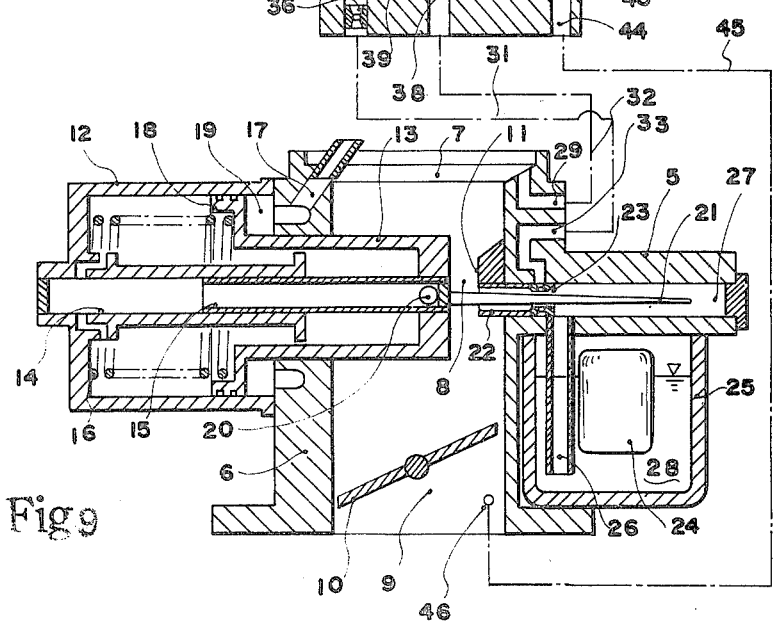

TEMPERATURE-RESPONSIVE CONTROL DEVICE FOR CARBURETOR

BACKGROUND OF THE INVENTION

1. Field of the Invention

The technic disclosed herein relates to the field of lift control of a thermo-wax for controlling choke valve, fast idle cam and so forth of a carburetor for automobile internal combustion engines.

More particularly, the present invention is concerned with a temperature-responsive control device for carburetors, in which a heat generating body such as a PTC heater, a heat-mass and a thermo-wax are disposed in series in a case from one side of the latter, so that an actuating rod extended from the thermo-wax is projected and retracted in accordance with an expansion and contraction of the thermo-wax thereby to actuate the choke mechanism, fast idle mechanism and so forth of the carburetor.

Still more particularly, in the temperature-responsive control device for carburetors in accordance with the invention, the portion of the heat-mass contactable with the heat-generating body is protruded in an annular form to avoid the surface contact, and the contact of the thermo-wax with the heat-mass is made at the temperature sensing portion of the thermo-wax or, alternatively, by means of a flange in a manner to isolate and float the temperature-sensitive portion.

2. Description of the Prior Art

As is well known, in some carburetors for automobile internal combustion engines, the choke mechanism and the fast idle mechanisms are actuated during warming up of the engine. In the conventional arrangements for actuating such mechanisms, a thermo-wax is heated by a heat-generating body such as PTC element (Positive Temperature Coefficient element) or the like to vary the lift of the actuating rod connected to the thermo-wax, thereby to actuate these mechanisms.

In this type of device, therefore, it is essential that the lift characteristics of the thermo-wax coincides or simulates as much as possible the warming up characteristics of the engine, for otherwise the correct operation of the aforementioned mechanisms will be failed.

Referring to FIG. 1 in which the axis of abscissa represents the time (minute) while axis of ordinate represents the temperature ($\theta$ °C.), the temperature characteristics P of the PTC heater is such that the Curie point is reached in about 10 seconds after the start-up of the engine, and exhibits a rise much steeper than the cooling water characteristics W which most closely approximates the engine warming up characteristics.

Therefore, if the thermo-wax is heated directly by the PTC heater, the dismissal of the choke valve and the dismissal of the fast idle cam are made at earlier moments than expected during the warming up of the engine, resulting in a deteriorated driveability in the cold state of engine or a re-starting failure due to an over-rich of the mixture.

In order to overcome this problem, it has become a common measure to interpose a heat-mass as a heat-transfer control body between the PTC heater and the thermo-wax, thereby to make the behaviour of the thermo-wax coincide with the state of warming up of the engine.

One of the typical heat masses used heretofore is an area control type heat-mass 1 (type A) as shown in FIG. 2. The area of contact with the PTC heater is reduced by a suitable design of the inside diameter d of the heat mass 1. By so doing, as will be seen from FIG. 4 in which the axes of abscissa and coordinate represent the time T (minute) and the lift L (mm) of thermo-wax, it is possible to delay the increase of the lift. The delay is increased as the diameter d is increased from the small diameter ds to large diameter dl via the medium diameter dm. The lift, however, is decreased to an impractically small level to fail the necessary motion of the choke or other mechanisms, if the diameter d is increased unlimitedly.

FIG. 3 shows a heat-mass 2 of another type (type B). In this case, the increase of the lift is delayed by increasing the volume of the heat-mass from a small volume Ds to a large volume Dl via a medium volume Dm by increasing the outside diameter D as shown in FIG. 5.

In this heat-mass 2, if the diameter D is increased to make the behaviour of the thermo-wax match the engine demand characteristics, the volume of the heat-mass is increased excessively to make is difficult to mount the device on an automobile engine. In addition, the surface area is increased undesirably to cause a reduction in the lift of the thermo-wax.

Therefore, even if well designed, these known heat-mass could provide characteristics far from the cooling water temperature characteristics W shown in FIG. 1, as will be understood from curves A and B in FIG. 1.

Under these circumstances, the present inventors have worked out a heat-input-control type heat mass 3 (type C) on the basis of theory and experiment.

In the heat-mass 3, the portion 4 for opposing and contacting the PTC heater is protruded in an annular form.

SUMMARY OF THE INVENTION

An object of the invention is to obviate various problems in the carburetors due to conventional heat-masses. Namely, according to the invention, the failure in matching the warming-up characteristics, attributable to the inadequate response of the conventional area control and volume control heat-masses, is eliminated basically by the adoption of an input-heat-control through varying the contact area of the heat-generating body.

Another object of the invention; the heat input from the heat-mass to the thermo-wax is made through a contact flange to realize the operation of the choke mechanism and fast idle cam matching as much as possible the warming up characteristics of the engine.

BRIEF DESCRIPTION OF THE DRAWINGS

FIG. 7 is an illustration of an example of combination of the heat-mass and the thermo-wax;

FIGS. 8 and 9 are illustrations of a low-temperature increasing device and a carburetor combined with the latter;

DETAILED DESCRIPTION OF THE PREFERRED EMBODIMENTS

Figure 1:
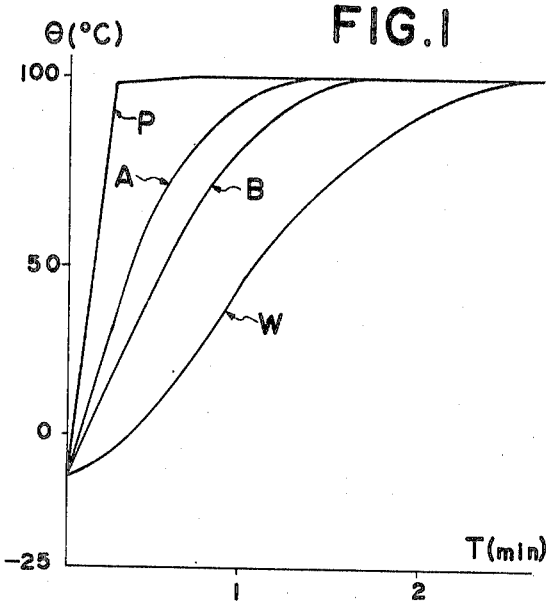
FIG. 1 is a chart showing the change of temperatures of a heat-generating body, conventional heat-mass and engine cooling water, in relation to time.

A preferred embodiment of the invention will be described hereinunder with reference to FIGS. 2 and 3, as well as FIG. 6 and other Figures following FIG. 6. Throughout the drawings, the same reference numerals are used to denote the same parts or members.

Figure 6:
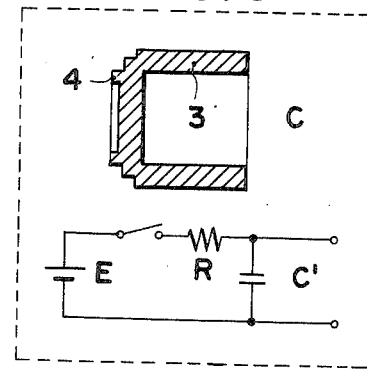
FIG. 6 is a schematic illustration of a heat-mass of the device in accordance with the invention.

As stated before, the heat-mass 3 shown in FIG. 6 is of an input-heat control type. The control characteristics of this heat-mass 3 will become clear from the following description of the control characteristics of an electric circuit, in comparison with the conventional arrangements shown in FIGS. 2 and 3.

Figure 2:
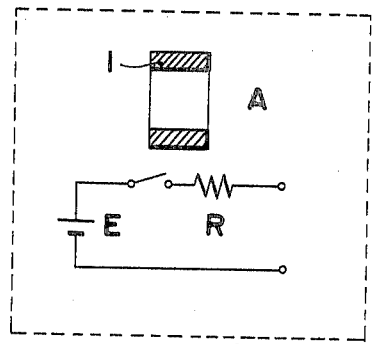
FIGS. 2 and 3 are the drawings for explaining conventional heat-masses.
Figure 4:
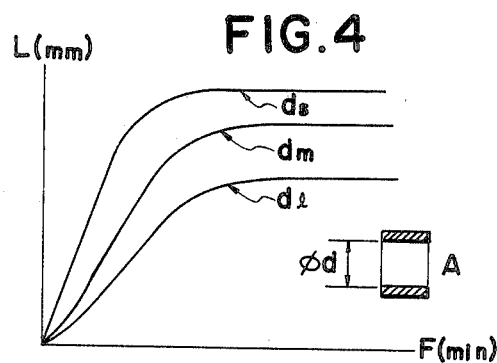
FIGS. 4 and 5 are the charts for explaining the lift-time characteristics of the heat-masses shown in FIGS. 2 and 3.

The conventional arrangement shown in FIG. 2 is a reduction control in which the control is made by means of a resistor R connected to a power supply E. This arrangement achieves the delay through a suppression of heating by increase of area.

Figure 3:
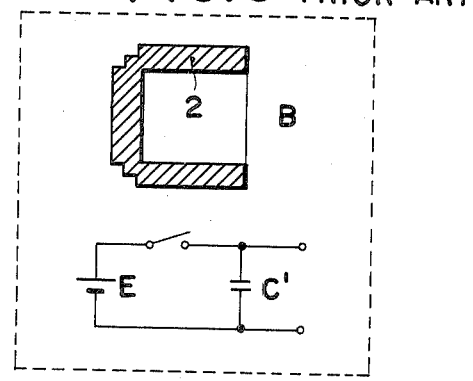
Figure 5:
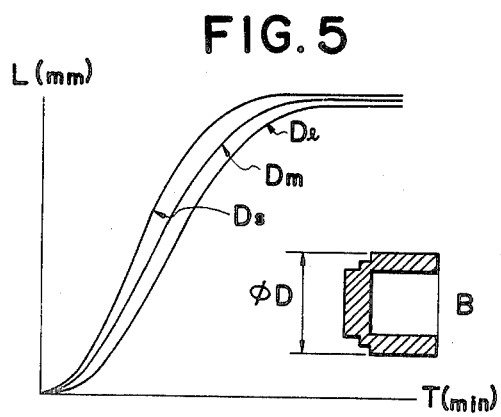

In the conventional arrangement shown in FIG. 3, the delay is controlled by means of a capacitor C' connected in parallel to the power supply E.

In contrast to the above, in the arrangement in accordance with the invention, a resistor R is connected in series to the power supply E and a capacitor C' is connected in parallel to the resistor R. The resistor R and the capacitor C' in combination constitute a smoothing circuit which acts to suppress any abrupt rise of heating, and to smooth the rise and fall of the characteristic curve.

In the input-heat-control type heat-mass 3, the contact portion 4 contacts the heat-generating body in an annular form, so that the heat input is made only gradually. Since the heat capacity is large, the transfer of the heat to the thermo-wax is made in accordance with the rate of heat input, from and after the medium period of operation.

FIGS. 7 to 10 show a practical embodiment of the invention applied to a choke of a variable-venturi type carburetor having an air damper.

The carburetor 5 has a barrel 6 in which formed is a mixing chamber 9 having a throttle valve 10. An air horn 7 and a venturi 8 are connected and formed at the upstream side of the mixing chamber 9. A suction chamber 12 formed to oppose to a bridge 11 provided at one side of the venturi 8 slidably receives a suction piston 13 adapted to increase and decrease the area of the venturi portion 8 in accordance with the change in the flow rate of the intake air. The suction piston 13 has a rod 15 guided by a rod guide 14 of the suction chamber 12. The suction piston 13 is resiliently biased in one direction by a spring 16. An atmospheric chamber 19 is defined by a flange 18 and communicated through an atmospheric passage 17 with the air horn 7. Vacuum is introduced into the suction chamber through a communication port 20 formed in the suction piston 13. The position of the suction piston 13 is determined by the balance between the force of the spring and the difference between the forces produced by the vacuum and the atmospheric pressure.

A metering needle 21 attached to and extended from the head of the suction piston 13 is adapted to move back and forth within a main nozzle 22 and a metering jet 23. Fuel from a well 2 is sucked from a float chamber 25 having a float ball 24 through a fuel inlet pipe 26, and is discharged from the main nozzle 22 after a metering by the metering jet 23.

A reference numeral 29 designates an atmospheric passage connected to the air horn 7 and is connected, as shown in FIG. 8, to a low-temperature increasing device 30 as a temperature-responsive control device constituting the gist of the invention, via passages 31 and 32. The atmospheric passage 29 is also connected to an air bleed passage 33 which in turn communicates with the above-mentioned metering jet 33.

The low-temperature increasing device 30 has a case 34 in which provided is a control passage 35 communicating with a passage 37 having an air bleed jet 36 and connected further to the aforementioned passage 31. The control passage 35 is connected also to the aforementioned passage 32 via a passage 38.

A by-pass passage 40 having an air bleed jet 39 is connected between the passages 37 and 38. A vacuum chamber 41 formed in the case 34 receives a pressing spring 42 which presses a vacuum change-over valve 34 adapted to open and close the by-pass passage 40.

The vacuum chamber 41 is in communication with a vacuum port 46 opening beneath the throttle valve 10, through passages 44 and 45, thereby to ensure an air bleed at the cold starting of the engine.

A reference numeral 47 denotes a holder adapted to hold a PTC heater 49 as a heat-generating body fixed to the case 34 and connected to a power supply (not shown) through a cord 48, and a heat-mass made of a brass and having a construction shown in FIG. 6, in such a manner that the annular contact portion 4 of the heat-mass 3 contacts the PTC heater 49.

As shown in detail in FIG. 7, a brass case 51 of a thermo-wax 50 has a heat-sensing portion 52 floated in the heat-mass 3 with a certain gap therebetween. The case 51 is supported at a flange portion 53 concentrically with the heat-mass.

The thermo-wax 50 has a diaphragm 54 made of a resin such as NBR biton and accomodating the wax body 55 and a semi-fluid body 56 consisting mainly of actactic polypropylene (APP). A piston rod 51 is extractably and retractably projected from the case 51, through a rubber piston 57 and a teflon seat 57'. A tapered valve 60 provided on an actuating rod 59 presses the thermo-wax 50 to the heat-mass 3 by the action of a spring 61 acting on the case 34, so that the heat-mass makes a pressure contact at its contact portion 4 with the PTC heater 49. Simultaneously, the valve 60 slides in the control passage 35 to open and close the passage 37.

In the construction described above, as the ignition switch is turned on to start an engine (not shown) from the cold state, the throttle valve 10 is opened by the fast idle mechanism so that the suction piston moves to open the air passage in accordance with the intake air flow rate, while the fuel 28 is sucked from the float chamber 25 through the fuel inlet pipe 26.

Figure 10:
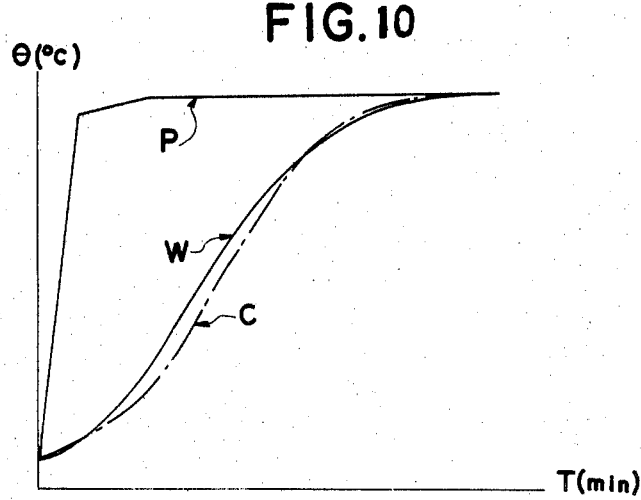
FIG. 10 is a chart showing the temperature characteristics of a heat-generating body, heat-mass and engine cooling water.

At the preliminary stage, the wax 55 of the thermo-wax 50 is contracted due to the low temperature, so that the actuating rod 59 of the low-temperature increasing device 30 is retracted by the force of the spring 61. As a result, the tapered valve 60 restricts the passage 37. On the other hand, the vacuum generated in the intake manifold due to running of the engine is transmitted to the vacuum chamber 41 from the vacuum port 46 via the passages 45, 44. The vacuum change-over valve 43 is moved overcoming the force of the spring 42 to open the passage so that the atmospheric air is induced from the air horn 7 at a reduced rate, through the passages 29,32, passage 38, air-bleed jet 39, by-pass passage 40, passage 37, air-bleed jet 36, and passages 31,32. In consequence, the fuel 28 is supplied at the increased rate to provide the desired air-fuel ratio of the mixture. Meanwhile, as shown in FIG. 10, the PTC heater 49 is heated to reach the Curie point in about 10 seconds. However, since the heat-mass 3 makes contact with the PTC heater 49 only at the annular contact portion 4, the temperature of the heat-mass 3 rises at a certain time lag. In addition, since the heat-sensing portion 52 of the thermo-wax case 50 is spaced from the heat-mass and the case 51 is supported at its flange 53, the rise of increase of the temperature of the wax 55 is lagged to realize a temperature rise characteristics C in FIG. 10 closely approximating the cooling water temperature characteristics W which most closely conform with the warming-up characteristics of the engine.

In consequence, the actuating rod 59 is extended substantially in accordance with the warming up characteristics of the engine, overcoming the force of the spring 61, so that the tapered valve 60 opens the passage 37 in accordance with the process of warming up of the engine.

Consequently, the cross-sectional area of restriction between the passage 37 connected to the metering jet 23 and the passages 38,35 leading from the air horn 7 is increased correspondingly to gradually increase the rate of air bleed to the metering jet 23. It is, therefore, possible to control the air-fuel ratio of the mixture in conformity with the air-fuel ratio demanded by the engine, during the warming up of the engine in the cold and hot states.

The thermo-wax 50 exhibits, after the stopping of the engine, a cooling characteristics as stated below. Since the heat-sensing portion 52 of the thermo-wax is surrounded by the heat-mass at a distance from the latter, the thermo-wax is not cooled rapidly but is cooled gradually following the engine cooling characteristics. Therefore, the tapered valve 60 does not restrict the passage 37 abruptly. In consequence, when the engine is re-started from the hot state, it is possible to obtain the air bleed rate matching the air-fuel ratio demanded by the engine in the instant state. Therefore, the excessive enrichment of the mixture is avoided to ensure a smooth re-starting of the engine.

Figure 11:
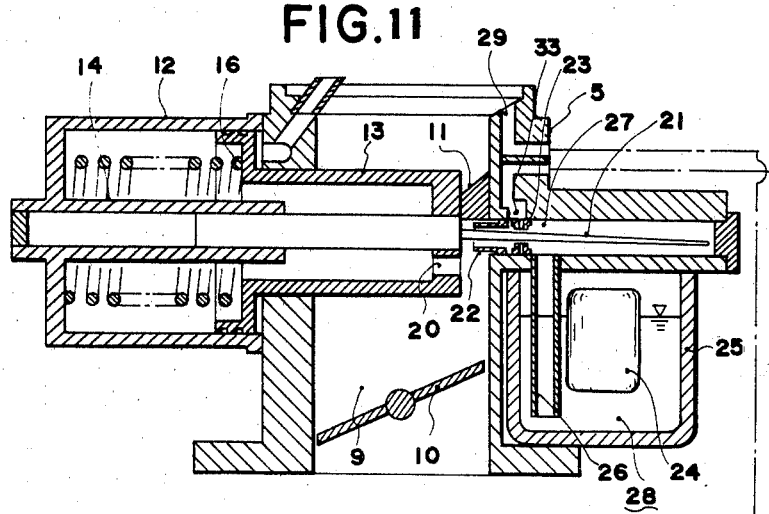
FIGS. 11 and 12 are illustrations of another embodiment, corresponding to FIGS. 9 and 8.
Figure 12:
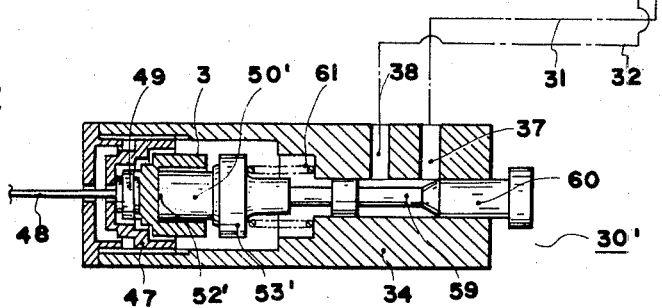

FIG. 11 shows another embodiment applied to a variable-venturi type carburetor as in the case of the preceding embodiment. As in the preceding embodiment, the heat-mass 3 makes contact with the PTC heater 49, at its annular contact portion 4. A thermo-wax 50' has a temperature characteristics approximating the cooling water temperature characteristics within an allowable temperature range. In view of the production cost and other factors, the heat-sensing portion 52' makes a surface contact with the heat-mass 3 but the flange 53' thereof is spaced from the heat-mass 3.

In the choke control from the cold start to warming up of the engine to the hot state, the temperature rise of the thermo-wax 50' is achieved chiefly by the function of the annular contact portion 4 of the heat mass 3 contacting the PTC element. However, it is possible to delay the rise of the temperature, because the heat-mass is of the input-heat control type as mentioned before. Accordingly, the tapered valve 60 is actuated by the actuating rod 59 to vary the area of the passage 37 so that the rate of bleed air supply to the metering jet 23 is controlled to realize an air-fuel ratio characteristics matching the air-fuel ratio demanded by the engine.

In this embodiment, the flange 53' of the thermo-wax 50' is kept out of contact with the rear end of the heat-mass 3 but is held to oppose to a small gap left therebetween. Therefore, it is possible to create such a state when the engine is stopped that the heat-mass 3 materially surrounds the thermo-wax 50' to prevent the quick cooling of the latter, thereby to eliminate the excessive enrichment of the mixture to ensure a good re-starting characteristics of the engine.

It is to be noted here that the described embodiments are not exclusive. For instance, the annular protrusions forming the annular contact portion of the heat-mass may be composed of a plurality of islands arranged in an annular form. It is also possible to make the flange of the thermo-wax contact with the heat-mass contact with a slit therebetween.

The control object of the temperature-responsive control device of the invention is not limited to the choke mechanism. Namely, the temperature-responsive control device of the invention can be used for the control of a fast idle cam mechanism. It is also possible to substitute other types of heat-generating bodies such as a hot-water heater, for the described PTC heater. It is also to be noted that the invention can be applied not only to the described variable-venturi type carburetors but carburetors of other types such as ordinary carburetors with fixed ventures.

As has been described, according to the invention, there is provided a temperature-responsive device for carburetors having a heat-generating body such as a PTC heater and a thermo-wax disposed in series with a heat-mass interposed therebetween, within a case attached to the carburetor, so as to actuate a choke mechanism or a fast idle mechanism by an actuating rod connected to the thermo-wax, wherein the heat-mass makes contact with the heat generating body at an annular contacting portion protruded in an annular form from the heat-mass. Therefore, even if the heat-generating body is heated rapidly after a cold start of the engine preceding the heating up of the engine, the heat input to the heat-mass is delayed suitably to prevent undesirable phenomenon such as opening of the choke valve before the sufficient warming up of the engine. In consequence, it is possible to obtain the air-fuel ratio characteristics well conforming with the air-fuel ratio demanded by the engine to ensure a good and stable driveability of the engine during the warming up.

According to the invention, it is possible to obtain a temperature characteristics of the thermo-wax conforming with the warming up characteristics of the engine, while making the heat-mass match the thermo-wax in shape, size and volume. This in turn provides a greater flexibility of design of the device to meet a large variety of engine.

In the embodiment in which the heat-mass surrounds the thermo-wax, the thermo-wax is cooled only gradually after the stopping of the engine, to realize a suitable choke valve opening at the time of re-starting of the engine, thereby to ensure a good re-starting characteristics of the engine while avoiding any excessive enrichment of the mixture.

According to an embodiment of the invention, the heat-sensing portion of the thermo-wax disposed adjacent to the heat-mass does not make direct contact with the heat-mass, but the thermo-wax is supported at its flange portion by the heat-mass. By so doing, the heat input from the heat-generating body to the thermo-wax is further delayed. In addition, since the thermo-wax is heated by the heat-mass surrounding the latter, it is possible to obtain a flat heating characteristics of the thermo-wax having gentle rise and fall of the temperature and well conforming with the warming characteristics of the engine. In consequence, it is possible to obtain a stable air-fuel characteristics and, hence, a good driveability of the engine during warming up of the latter.

Furthermore, since the thermo-wax is completely surrounded by the heat-mass, it is possible to obtain a slow cooling of the thermo-wax after the stopping of the engine, well conforming with the cooling characteristics of the engine, by a suitable selection of volume of the heat-mass and the design of the surface area of the same, to ensure a good re-starting characteristics of the engine.

What is claimed is:

1. A temperature-responsive control device for carburetor having a case attached to said carburetor, a heat-generating body disposed in said case, a thermo-wax disposed to oppose to said heat-generating body across a heat-mass and an actuating rod connected to said thermo-wax, wherein the improvement comprises that the portion of said heat-mass opposing and contacting said heat-generating body is protruded in an annular form.

2. A temperature-responsive control device for carburetors as claimed in claim 1, wherein the portion of said heat-mass opposing and contacting said heat-generating body is constituted by a plurality of island-like protrusions arranged in an annular form.

3. A temperature-responsive control device for carburetor having a case attached to said carburetor, a heat-generating body disposed in said case, a thermo-wax disposed to oppose to said heat-generating body across a heat-mass and an actuating rod connected to said thermo-wax, wherein the improvement comprises that the portion of said heat-mass opposing and contacting said heat-generating body is protruded in an annular form and that said thermo-wax has a temperature sensing portion spaced from said heat-mass and having a flange portion contacting in an annular form with said heat-mass.

4. A temperature-responsive control device for carburetors as claimed in claim 3, wherein the flange portion of said thermo-wax makes contact with said heat-mass in such a manner as to leave a slit between said flange portion and said heat-mass.

5. A temperature-responsive control device for carburetors having a case attached to said carburetor, a heat-generating body disposed in said case, a thermo-wax disposed to oppose to said heat-generating body across a heat-mass, and an actuating rod connected to said thermo-wax, an improvement which comprises that the portion of said heat-mass opposing and contacting said heat-generating body is protruded in an annular form, while a part of the heat-sensing portion of said thermo-wax contacts said heat-mass in such a manner that a flange portion of said thermo-wax is spaced from said heat mass.

* * * * *